(12) United States Patent
Makino et al.

(10) Patent No.: US 6,584,367 B1
(45) Date of Patent: Jun. 24, 2003

(54) STAGE POSITION CONTROL METHOD AND STAGE POSITION CONTROL APPARATUS CAPABLE OF IMPROVING POSITIONING PRECISION

(75) Inventors: Kenichi Makino, Hiratsuka (JP); Yoshiyuki Tomita, Hiratsuka (JP); Hidehiko Mori, Hachioji (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 531 days.

(21) Appl. No.: 09/608,068

(22) Filed: Jun. 30, 2000

(30) Foreign Application Priority Data

Jul. 2, 1999 (JP) ............................................. 11-189336

(51) Int. Cl.$^7$ .............................. G05B 1/00; G05B 19/18
(52) U.S. Cl. ............................... 700/60; 700/42; 700/45; 700/61; 318/561
(58) Field of Search .............................. 700/28, 29, 30, 700/40, 42, 44, 45, 56, 60, 61, 186, 193; 318/561, 569

(56) References Cited

U.S. PATENT DOCUMENTS 5,511,930 A * 4/1996 Sato et al. .................. 414/676

FOREIGN PATENT DOCUMENTS

| JP | 6-302497 | 10/1994 |
|---|---|---|
| JP | 8-314517 | 11/1996 |
| JP | 10-277771 | 10/1998 |
| JP | 11-31014 | 2/1999 |
| JP | 2000-155186 | 6/2000 |

* cited by examiner

Primary Examiner—Paul P. Gordon
(74) Attorney, Agent, or Firm—Arent Fox Kintner Plotkin & Kahn

(57) ABSTRACT

A Y stage is capable of translational driving in the Y-axial direction, by independently controllable Y1 linear motor and Y2 linear motor. The amount of movement of the Y stage is detected by a Y1 linear encoder and Y2 linear encoder, and fed back to a Y control system and θ control system. The Y control system outputs a translational thrust command value, by receiving the average value of each positional detecting value measured by the Y1 linear encoder and Y2 linear encoder as the stage translational direction position feedback value. The θ control system receives the difference between each position detecting value as a stage yawing direction position feedback value, and outputs a yawing direction thrust command value. A non-interference block outputs Y1 linear motor thrust command value and Y2 linear motor thrust command value, by the use of the translational thrust command value and the thrust command value. Thus, the movement of the Y stage can be divided into translational direction movement and yawing direction movement, and independently controlled and compensated.

7 Claims, 6 Drawing Sheets

STAGE POSITION CONTROL METHOD AND STAGE POSITION CONTROL APPARATUS CAPABLE OF IMPROVING POSITIONING PRECISION

BACKGROUND OF THE INVENTION

The present invention relates to a stage position control method and a stage position control apparatus for a stage device, and more particularly relates to a stage position control method and a stage position control apparatus applied to a stage device driven in the X-axial and Y-axial directions.

Known examples of such stage position control apparatuses are stage position control apparatuses comprising a Proportional Integral Differential (hereafter referred to as PID) controller, and stage position control apparatuses comprising the PID controller and a Feed Forward (hereafter referred to as FF) controller.

Such stage position control apparatuses have the problem that capabilities regarding constant speed, positioning precision, etc., deteriorate due to disturbances owing to tension and the like in power supply cables and signal transmission cables. Of these, with regard to signal transmission cables, disturbances owing to tension occur due to the following reasons. The signal transmission cables must be joined between a moving portion and a fixed portion of the stage device. The signal transmission cable has flexibility, and deforms to follow the movement of the stage whenever the stage moves. However, deforming of the signal transmission cable affects the movement of the stage, however slight. In other words, the tension of the signal transmission cable affects the control system as disturbance. This is also true in the event that a guide mechanism of the stage has static pressure bearings. That is, in the event that static pressure bearings are used, the moving portion and the fixed portion of the stage device must be connected with a flexible pneumatic tube.

Increased control gain for the control system might be considered to reduce the effects of such disturbance. However, there is a limit to how high the control gain can be, and in actual practice, speed fluctuations and position error occur due to such disturbance.

SUMMARY OF THE INVENTION

Accordingly, it is an object of the present invention to provide a stage position control method applied to stage devices which are components of machine tools, semiconductor manufacturing apparatuses, measurement equipment, and other such industrial equipment, which is capable of improving the positioning precision and speed stability of the stage.

Another object of the present invention is to provide a stage position control apparatus suitable to the above stage position control method.

The stage position control method according to the present invention is applied to a stage device comprising a stage, a driving axis which mounts the stage and is driven in one axial direction, and first and second driving units for performing translational driving of the driving axis independently at two positions. In the stage position control method, the amount of movement of the first and second driving units are detected by first and second position detecting units, respectively, and the first and second driving units are controlled by first and second feedback control systems.

According to a first aspect of the present invention, the first feedback control system outputs a translational thrust command value to the first and second driving units by receiving an average value of each position detecting value measured by the first and second position detecting units as a position feedback value of the stage translational direction. The second feedback control system receives a difference between each position detecting value as a position feedback value of the stage yawing direction, and outputting a yawing direction thrust command value to the first and second driving units. Thus, the motion of the stage is divided into translational direction motion and yawing direction motion, and independently controlled and compensated thereby.

The stage position control apparatus according to the present invention is applied to the above stage device. The amount of movement of the first and second driving units are detecting by first and second position detecting units, respectively. The first and second driving units are controlled by first and second feedback control systems, respectively.

The stage position control apparatus comprises a coordinate converting block for calculating an average value from each position detection value measured by the first and second position detecting units and outputting the result to the first feedback control system as a position feedback value of the stage translational direction, and also calculating a difference between the each position detection value and outputting the result to the second feedback control system as a position feedback value of the stage yawing direction. The first feedback control system comprises a first subtracter for calculating a difference between a stage translational direction position command value and the stage translational direction position feedback value, a first PID compensator which receives the difference calculated at the first subtracter as the input thereof and outputs a thrust target value, a disturbance observer which computes estimated disturbance force for the stage, based on a translational thrust command value calculated from the thrust target value and on stage translational direction position feedback value, and a second subtracter for calculating a new translational thrust command value by subtracting the estimated disturbance for the stage from the thrust target value, and outputting the new translational thrust command value to the first and second driving units. The second feedback control system comprises a third subtracter for calculating a difference between a stage yawing direction command value and the stage yawing direction position feedback value, and a second PID compensator which receives the difference calculated at the third subtracter as the input thereof and outputs a yawing direction thrust command value to the first and second driving units.

The present invention is suitably applied to a driving axis (gantry axis) comprising independently-controlled first and second driving units and first and second position detecting units being positioned across a certain distance. According to the present invention, occurrence of error due to yawing of the stage can be suppressed, and compensating for disturbance acting on the stage allows positioning precision of the stage to be improved.

Also, dividing the movement of the stage into translational movement in one axial direction and yawing movement, and controlling and compensating accordingly, allows not only the translational movement precision but the yawing movement precision of the stage to be improved, as well. Further, regarding the translational movement, estimating and compensating for the disturbance torque acting on the driving axis allows fluctuations in speed and position of the stage to be suppressed.

DESCRIPTION OF THE PREFERRED EMBODIMENTS

An example of a stage device to which the present invention is applied will be given with regard to an X-Y stage device proposed by the present Assignee (Japanese Unexamined Patent Publication No. 2000-155186), with reference to FIG. 1.

Figure 1:
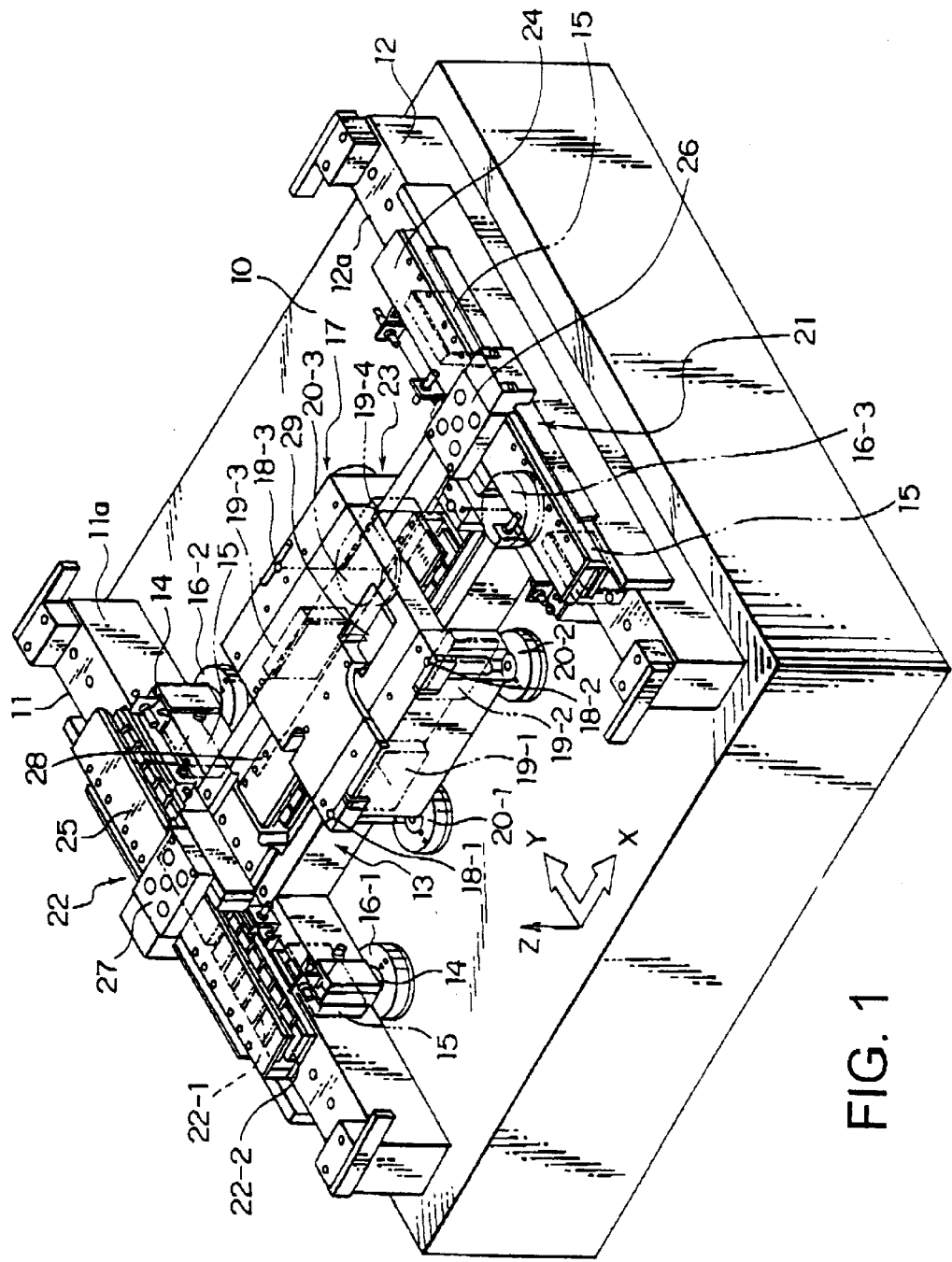
FIG. 1 is a diagram illustrating an example of an X-Y stage device to which the present invention is applied.

In FIG. 1, the X-Y stage device has a fixed portion and a moving portion. The fixed portion comprises a base 10 with an upper plane thereof serving as a guide plane for a static pressure bearing, and a pair of guide rails 11 and 12 fixed on the base 10. The guide rails 11 and 12 each extend in the Y-axial direction, and have mutually opposing guide planes 11a and 12a.

The moving portion has a first moving portion which is guided in the Y-axial direction along the guide planes 11a and 12a. The first moving portion includes a Y stage 13, four static pressure bearing pads 15, and three static pressure bearing pads 16-1 through 16-3. The Y stage 13 is situated between the guide rails 11 and 12, with T-shaped portions on either edge thereof. The static pressure bearing pads 15 each connect to the side plane of the T-shaped portions of the Y stage 13 by couplings 14 (only two shown). The couplings 14 each have one freedom in motion, of rotation around the Z-axis perpendicular to the X-Y plane. The static pressure bearing pads 16-1 through 16-3 are each connected to the lower plane of the Y stage 13. The static pressure bearing pad 16-3 is situated at a position corresponding to the center axis of the Y stage 13. On the other hand, the static pressure bearing pads 16-1 and 16-2 are positioned approximately symmetrically as to the center axis of the Y stage 13. That is to say, the static pressure bearing pads 16-1 through 16-3 are all arranged such that line segments connecting the centers thereof form an isosceles triangle. The Y stage 13 has two sides parallel to the X-axial direction. These two sides serve as reference planes for guiding the X stage 17.

The moving portion further includes a second moving portion which is guided in the X-axial direction and also guided in the Y-axial direction. The second moving portion includes an X stage 17 for mounting a work, four static pressure bearing pads 19-1 through 19-4, and three static pressure bearing pads 20-1 through 20-3. The X stage 17 has a generally U-shaped form, and is assembled to the Y stage 13 so as to straddle the Y stage 13. The static pressure bearing pads 19-1 through 19-4 are each connected to the inner plane of the generally U-shaped form of the X stage 17 so as to face the side plane of the Y stage 13. The static pressure bearing pads 20-1 through 20-3 are each connected to the lower plane of the X stage 17 by couplings 18-1 through 18-3.

The Y stage 13 is restricted in the X-axial direction to the base 10 by non-contact, by the static pressure bearing pads 15. The Y stage 13 is also restricted in the Z-axial direction to the base 10 by non-contact, by the weight of the static pressure bearing pads 16-1 through 16-3, and the weight of the Y stage 13. Due to these restrictions of two directions, the Y stage 13 is movable in the Y-axial direction (linearly guided).

In the same way, the X stage 17 is restricted in the Y-axial direction to the Y stage 13 by non-contact, by the static pressure bearing pads 19-1 through 19-4. The X stage 17 is also restricted in the Z-axial direction to the base 10 by non-contact, by the weight of the static pressure bearing pads 20-1 through 20-3, and the weight of the X stage 17. Due to this configuration, the X stage 17 is linearly guided in the X-axial and Y-axial directions as to the base 10.

The X-Y stage device has a pair of linear motors as the driving source of the Y stage 13, a Y1 linear motor 21 and a Y2 linear motor 22. The Y1 linear motor 21 and Y2 linear motor 22 are respectively configured on the guide rails 11 and 12. The X-Y stage device also has an X linear motor 23 as the driving source for the X stage 17, configured on the Y stage 13.

Such linear motors are known in the art, so the Y2 linear motor 22 will be described briefly. The Y2 linear motor 22 comprises a coil (not shown) extended from the Y stage 13 and positioned between a great number of upper side permanent magnets 22-1 and a great number of lower side permanent magnets 22-2 with a gap disposed therebetween.

One side of the two T-shaped portions of the Y stage 13 has a Y1 linear scale 24 provided to the guide rail 12 and a Y1 linear encoder 26 for detecting the amount of movement made by the Y1 linear motor 21. The other side of the two T-shaped portions of the Y stage 13 has a Y2 linear scale 25 provided to the guide rail 11 and a Y2 linear encoder 27 for detecting the amount of movement made by the Y2 linear motor 22.

The X-stage 17 has an X linear encoder 29 which detects the amount of movement of the X linear motor 23 in cooperation with the X linear scale 28 which the Y stage 13 has.

With such an X-Y stage device, the Y stage 13 can be considered to be a driving axis which is subjected to translational driving by two independent driving sources. Such a driving axis is also referred to as a gantry axis. In any case, with such an X-Y stage device, the distance between the static pressure bearings for the Y stage 13 is short as compared to the distance between the two guide rails 11 and 12. In this case, the Y stage 13 readily exhibits rotating movement in the direction orbiting the Z-axis (yawing movement) at the time of the Y stage 13 moving.

In order to avoid this, the distance between the static pressure bearings of the Y stage 13 must be made longer as compared to the distance between the two guide rails 11 and 12. However, such an arrangement has the problems that the footprint of the X-Y stage device increases, the weight of the X-Y stage device becomes heavier making high-speed movement difficult, and so forth.

Accordingly, at the time of moving the Y stage 13, both ends of the Y stage 13 are driven with two motors (the Y1 linear motor 21 and Y2 linear motor 22). The following three control methods can be generally conceived for the driving axis control method here.

Figure 2:
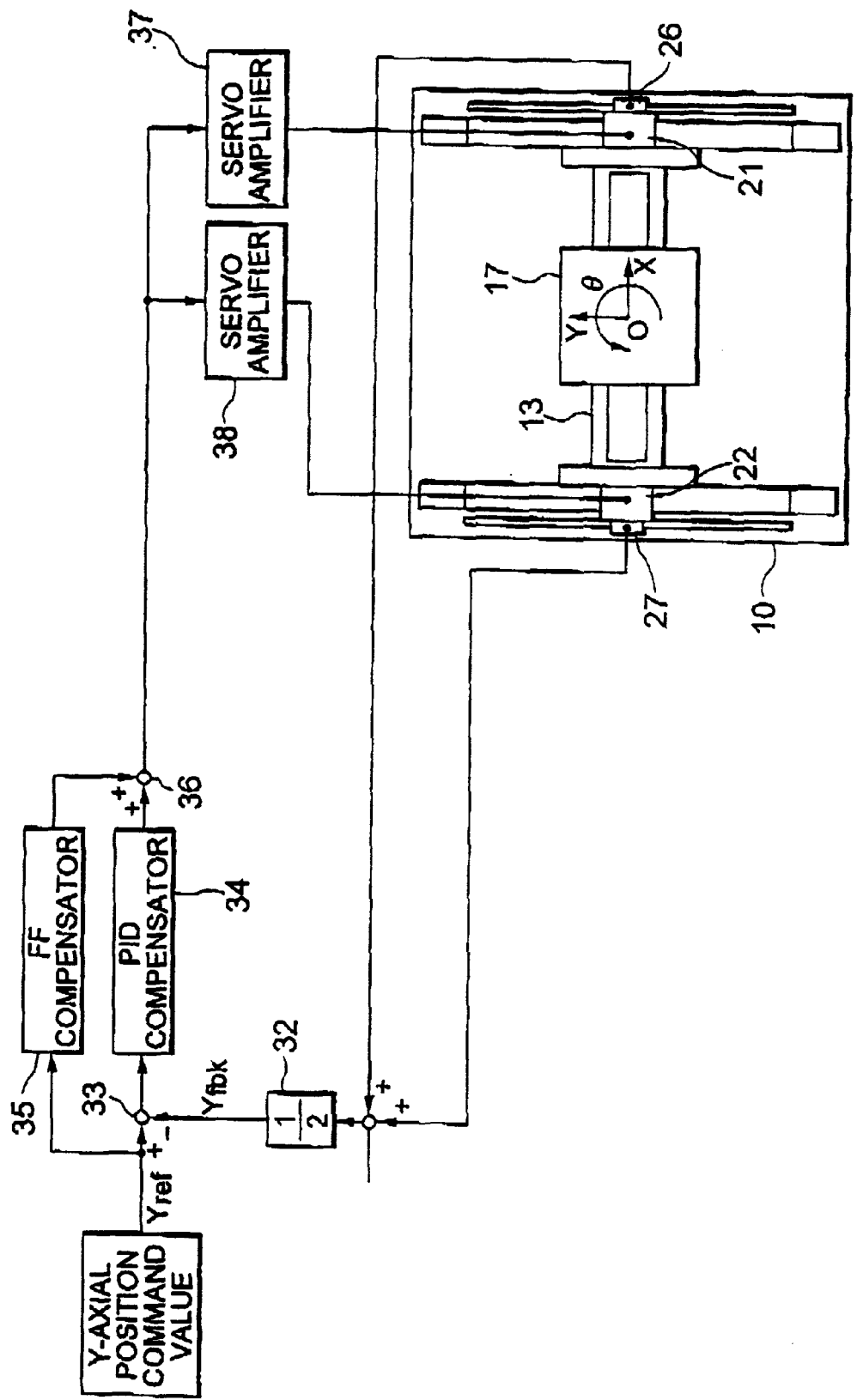
FIG. 2 is a diagram illustrating the configuration of a first example of a conventional stage position control apparatus applied to the X-Y stage device shown in FIG. 1.

The first control method will be described with reference to FIG. 2. The parts which are the same as those shown in FIG. 1 are denoted with the same reference numerals. With the first control method, the same thrust commands are provided to the Y1 linear motor 21 and Y2 linear motor 22 by a common Y-axial (translational direction) control system. The Y-axial control system executes PID compensation by a feedback control system. The feedback control system takes a Y-axial position command value as a command input $Y_{ref}$, and an averaged value of the position detection value from the Y1 linear encoder 26 and the position detection value from the Y2 linear encoder 27 as a feedback input $Y_{fbk}$. To this end, the Y-axial control system includes an adder 31 for adding the position detection value from the Y1 linear encoder 26 and the position detection value from the Y2 linear encoder 27.

The Y-axial control system also includes a computing unit 32 for multiplying the addition results by ½ to obtain the average thereof, a subtracter 33 for computing the difference between the Y-axial position command value and average value, and a PID compensator 34. The Y-axial control system further includes an FF compensator 35 for improving following capabilities. The adder 26 adds the output of the FF compensator 35 and the PID compensator 34. The output of the adder 36 is provided to a servo amplifier 37 for the Y1 linear motor 21 and to a servo amplifier 38 for the Y2 linear motor 22, as thrust command values.

With the above first control method, no error margin in the yawing movement of the stage is detected, so no control for suppressing such is carried out. The mechanical rigidity regarding the yawing motion determines how great the margin of error is. As described above, with configurations where the distance between the static pressure bearings of the Y stage 13 is short as compared to the distance between the guide rails 11 and 12, mechanical rigidity as to yawing movement is low, so a great yawing margin of error occurs. Also, the center of gravity of the Y-axial direction moving portion (the Y stage 13 and X stage 17) changes according to the position of the X stage 17, so how great the yawing margin of error is changes according to the position of the X stage 17.

Figure 3:
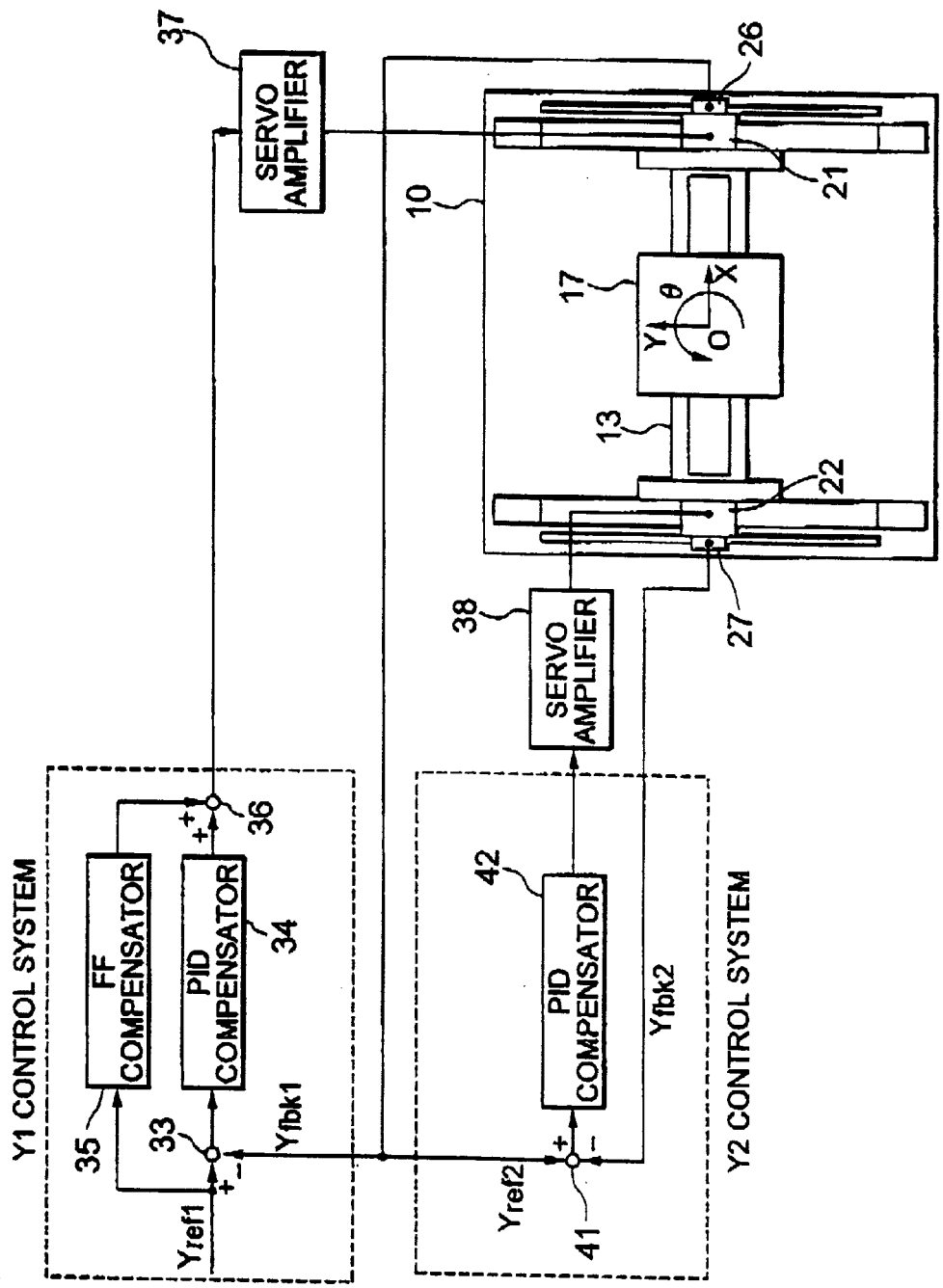
FIG. 3 is a diagram illustrating the configuration of a second example of a conventional stage position control apparatus applied to the X-Y stage device shown in FIG. 1.

The second control method will be described with reference to FIG. 3. The parts which are the same as those shown in FIG. 2 are denoted with the same reference numerals. The second control method has a Y1 control system as the control system for the Y1 linear motor 21, and a Y2 control system as the control system for the Y2 linear motor 22. The Y1 control system and the Y2 control system executed control separately.

The Y1 control system executes PID compensation by a Y1 feedback control system. The Y1 feedback control system takes the Y-axial position command value as a command input $Y_{ref1}$, and the detection value from the Y1 linear encoder 26 as a feedback input $Y_{fbk1}$. Here also, the Y1 control system has the FF compensator 35 for improving following capabilities. The Y1 control system acts as described in FIG. 2, except for the feedback input being different.

On the other hand, the Y2 control system executes PID compensation by a Y2 feedback control system. The Y2 feedback control system takes the position detection value from the Y1 linear encoder 26 as a command input $Y_{ref2}$, and the position detection value from the Y2 linear encoder 27 as a feedback input $Y_{fbk2}$. To this end, the Y2 control system has an adder 41 for adding the position detection value $Y_{ref2}$ from the Y1 linear encoder 26 and the position detection value $Y_{fbk2}$ from the Y2 linear encoder 27, and a PID compensator 42.

With the second control method, the Y2 linear motor 22 performs slave operation with the Y1 linear motor 21 as the master, and thus is also called the master-slave control method. With the second control method as well, no error margin in the yawing movement of the Y stage 13 is detected, so no control for suppressing such is carried out. At the time of moving in the Y-axial direction, the Y1 linear motor constantly leads. This means that a state of yawing error margin is always occurring at the time of moving, and the direction of yawing error margin inverts when the direction of movement is reversed. The mechanical rigidity determines how great the yawing margin of error is. The center of gravity of the Y-axial direction moving portion (the Y stage 13 and X stage 17) changes according to the position of the X stage 17, so how great the yawing margin of error is changes according to the position of the X stage 17.

Figure 4:
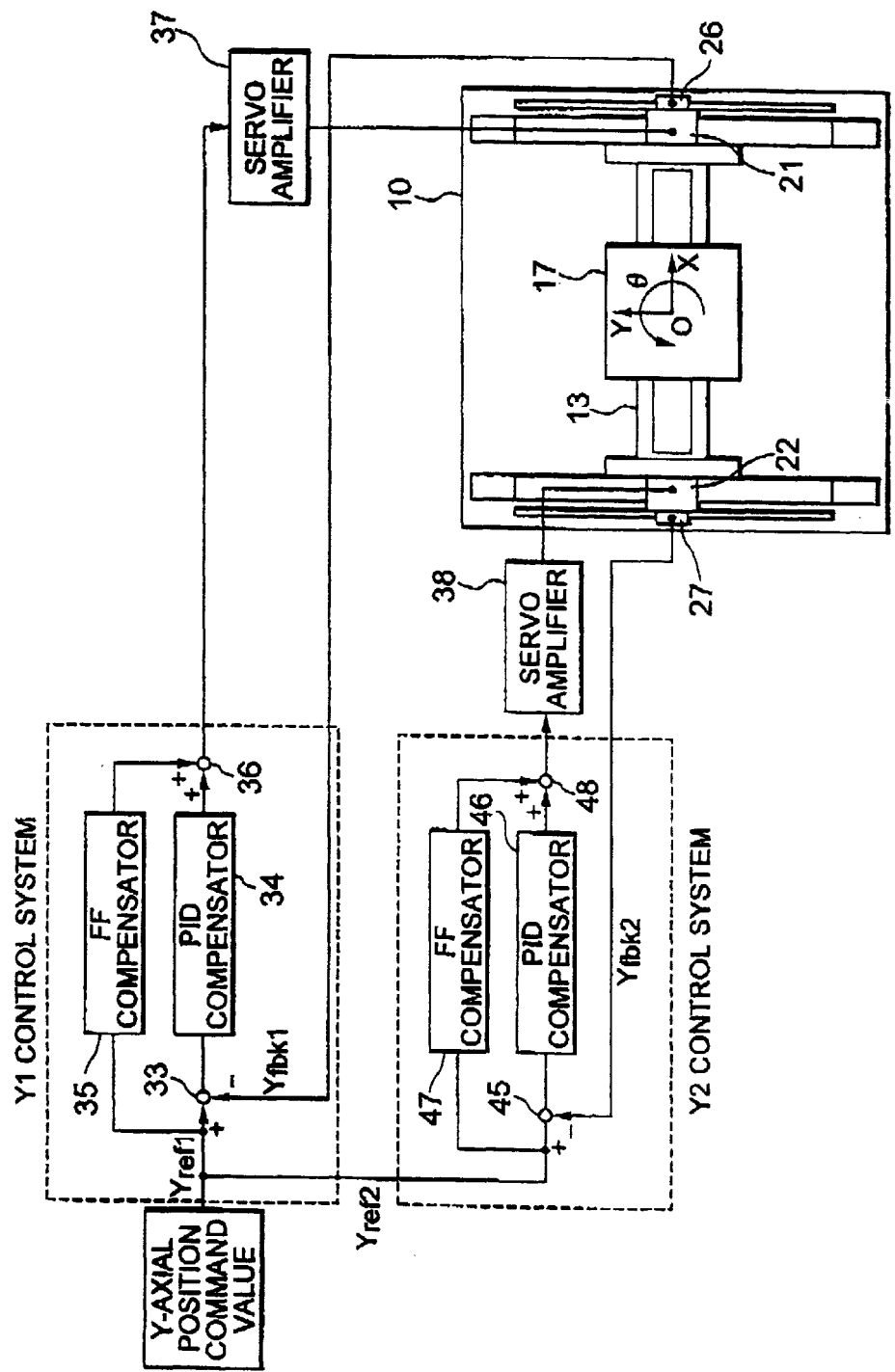
FIG. 4 is a diagram illustrating the configuration of a third example of a conventional stage position control apparatus applied to the X-Y stage device shown in FIG. 1.

The third control method will be described with reference to FIG. 4. The parts which are the same as those shown in FIG. 3 are denoted with the same reference numerals. The third control method also has a Y1 control system as the control system for the Y1 linear motor 21, and a Y2 control system as the control system for the Y2 linear motor 22. Control of the Y1 control system and Y2 control system is executed independently. The Y1 control system is the same as that shown in FIG. 3, and the Y2 control system has the same configuration as the Y1 control system.

The Y1 control system executes PID compensation by a Y1 feedback control system. The Y1 feedback control system takes the Y-axial position command value as a command input $Y_{ref1}$, and the position detection value from the Y1 linear encoder 26 as the feedback input $Y_{fbk1}$. On the other hand, the Y2 control system executes PID compensation by a Y2 feedback control system. The Y2 feedback control system takes the Y-axial position command value as a command input $Y_{ref2}$, and the position detection value from the Y2 linear encoder 27 as the feedback input $Y_{fbk2}$. To this end, the Y2 control system has a subtracter 45 for computing the difference between the Y-axial position command value $Y_{ref2}$ and the position detection value $Y_{fbk2}$ from the Y2 linear encoder 27, and a PID compensator 46. Here also, the arrangement has an FF compensator 47 for improving following capabilities, with the output of the FF compensator 47 and the output of the PID compensator 46 being added by an adder 48. The output of the adder 48 is provided as the thrust command value to a servo amplifier 38 for the Y2 linear motor 22.

With the third control method, the Y1 linear motor 21 and Y2 linear motor 22 are viewed as independent motors, and controlled accordingly. Hence, error owing to the yawing movement of the Y stage 13 is detected as error in the translational direction of the motors, and is thus controlled. However, in reality, the Y1 linear motor 21 and the Y2 linear motor 22 are mechanically joined, so both control systems interfere by mechanical rigidity. Accordingly, there are fundamental problems in executing independent control. This problem is markedly exhibited in the event that the control gain is raised to improve positioning precision, i.e., a response characteristic. That is to say, the action of one linear motor acts as disturbance on the other linear motor with which it is linked with mechanical rigidity, thereby markedly manifesting the problem of deterioration in the stability of the control system.

In the event that the X stage 17 is in the center, there is no interference due to linear motor thrust in principle, as long as the response characteristic of the Y1 control system and Y2 control system are matched perfectly. However, in the event that some sort of disturbance force acts upon the stage, the yawing movement occurring due to that force generates interference between the linear motors. Also, the center of gravity of the moving portion moves with movement of the position of the X stage 17, so this interference component changes and the yawing error also changes.

Further, effects on the positioning precision and speed consistency due to disturbances on the stages from such as tension from power supply cables, signal transmitting cables, pneumatic tubes and the like, thrust ripples of the linear motors, etc., are common problems to the above first through third control methods.

In order to deal with such disturbance factors, the margin of error must be lowered by raising the control gain of the feedback control system. However, there is a limit to how high the control gain can be set, from limits on the stability of the control system determined by mechanical resonance frequencies of the stage device or controller computing time for controlling, etc. Accordingly, positioning error and speed change actually occur due to disturbance factors such as described above.

Figure 5:
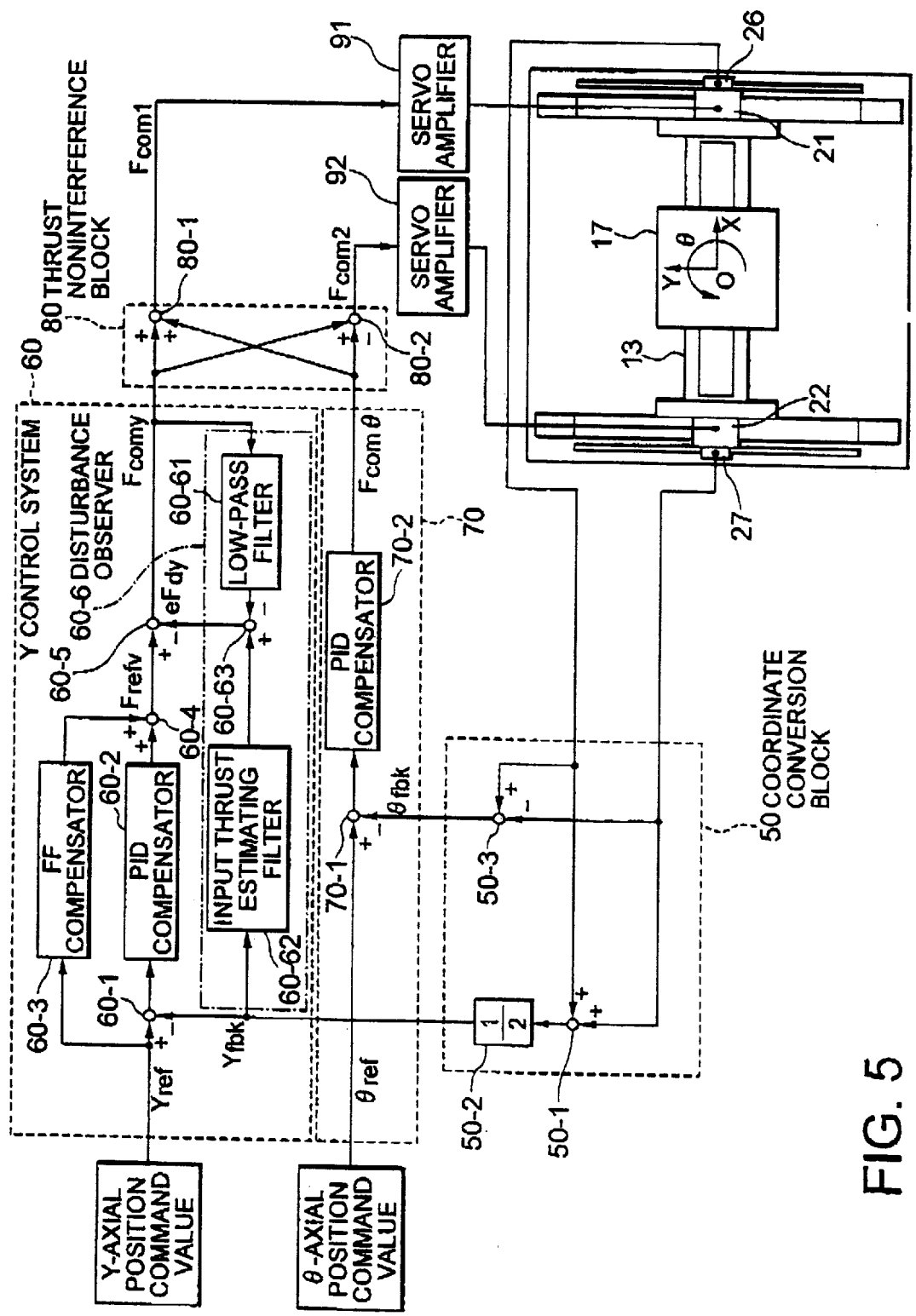
FIG. 5 is a diagram illustrating the configuration of the stage position control apparatus according to an embodiment of the present invention.
Figure 6:
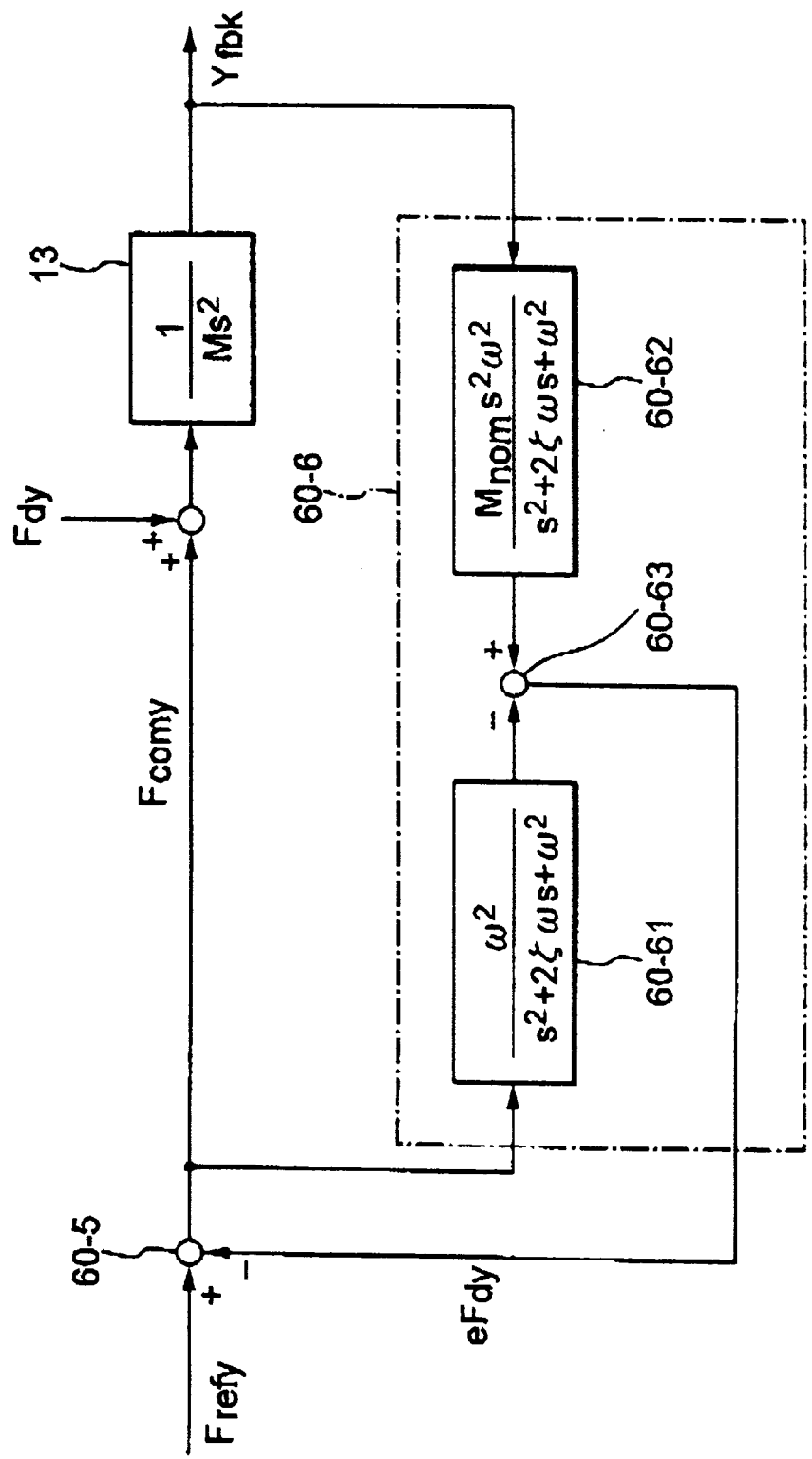
FIG. 6 is a diagram for describing the principle of a disturbance observer shown in FIG. 5.

A stage position control device will be described with a preferable embodiment of the present invention, with reference to FIGS. 5 and 6. In FIG. 5, the configuration of the stage device is the same as the X-Y stage device described in FIG. 1. The stage position control device according to the present invention comprises a coordinate conversion block 50, a Y (stage translational direction) control system 60 for feedback controlling of the Y1 linear motor 21, a θ (stage yawing direction) control system 70 for performing feedback control of the Y2 linear motor 22, and a thrust non-interference block 80.

The coordinate conversion block 50 includes an adder 50-1 and a computing unit 50-2. The adder 50-1 adds the position detection value from the Y1 linear encoder 26 and the position detection value from the Y2 linear encoder 27. The computing unit 50-2 multiplies the addition result of the adder 50-1 by ½ to calculate the average thereof. Thus, the coordinate conversion block 50 calculates the Y-axial direction translational position from the average value of the position detection value from the Y1 linear encoder 26 and the position detection value from the Y2 linear encoder 27, and takes this as a feedback input $Y_{fbk}$ for the Y control system. The coordinate conversion block 50 also includes a subtracter 50-3 for computing the difference between the position detection value from the Y1 linear encoder 26 and the position detection value from the Y2 linear encoder 27. Accordingly, the coordinate conversion block 50 calculates the yawing direction position from the difference between the position detection value from the Y1 linear encoder 26 and the position detection value from the Y2 linear encoder 27, and takes this as a feedback input $\theta_{fbk}$ for the θ control system 70.

The Y control system 60 takes the Y-axial position command value as a command input $Y_{ref}$. The Y control system 60 includes a subtracter (first subtracter) 60-1 for computing the difference between the command input $Y_{ref}$ and the feedback input $Y_{fbk}$, and a PID compensator (first PID compensator) 60-2 to which the subtraction result is inputted. The Y control system 60 also includes an FF compensator 60-3 to which the command input $Y_{ref}$ is inputted, and an adder 60-4 which calculates a thrust target value $F_{refy}$ by adding the outputs of the PID compensator 60-2 and the FF compensator 60-3. The Y control system 60 further includes an adder 60-5 and a disturbance observer 60-6.

The Y control system 60 takes the Y-axial position command value as the command input $Y_{ref}$, and has a feedback control system wherein the feedback input $Y_{fbk}$ from the coordinate conversion block 50 is taken as the feedback input, as the basic configuration thereof. The feedback control system is configured of the subtracter 60-1, PID compensator 60-2, subtracter 60-5, and disturbance observer 60-6. As described above, the FF compensator 60-3 is for improving following capabilities, and may be omitted in some cases. In the Y control system 60, a Y-axial direction translational thrust command value $F_{comy}$ is calculated by the PID compensator 60-2, the disturbance observer 60-6, and the FF compensator 60-3.

The θ control system 70 receives a θ-axial position command value as a command input $\theta_{ref}$, and has a subtracter (third subtracter) 70-1 and a PID compensator (second PID compensator) 70-2. The subtracter 70-1 computes the difference between the command input $\theta_{ref}$ and the feedback input $\theta_{fbk}$ from the coordinate conversion block 50. That is to say, the θ control system 70 has a feedback control system which takes the θ-axial position command value as the command input $\theta_{ref}$, and the feedback input $\theta_{fbk}$ from the coordinate conversion block 50 as the feedback input. In the control system 70, a θ-directional thrust command value $F_{comq}$ is calculated by the use of the PID compensator 70-2.

The thrust non-interference block 80 includes an adder (first adder) 80-1, and calculates a thrust command value $F_{com1}$ for the Y1 linear motor 21 from the sum of the Y-axial direction translational thrust command value $F_{comy}$ and the θ-directional thrust command value $F_{com\theta}$. The thrust non-interference block 80 also includes a subtracter (fourth subtracter) 80-2 which computes a thrust command values $F_{com2}$ for the Y2 linear motor 22 from the difference between the Y-axial direction translational thrust command value $F_{comy}$ and the θ-directional thrust command value $F_{com\theta}$. The thrust command value $F_{com1}$ and $F_{com2}$ are respectively provided to the Y1 linear motor 21 and Y2 linear motor 22 via servo amplifiers 91 and 92.

The disturbance observer 60-6 includes a low-pass filter 60-61 (first low-pass filter) which receives the Y-axial direction translational thrust command value $F_{comy}$ as the input thereof, an input thrust estimating filter 60-62 which receives the feedback input $Y_{fbk}$ as the input thereof, and a subtracter 60-63 which computes an estimated disturbance force $eF_{dy}$ from the outputs of the input thrust estimating filter 60-62 and the low-pass filter 60-61.

The subtracter (second subtracter) 60-5 in the Y control system 60 subtracts the estimated disturbance force $eF_{dy}$ from the thrust target value $F_{refy}$ and outputs the Y-axial direction translational thrust command value $F_{comy}$.

Next, the operation of the stage position control device will be described. The coordinate conversion block 50 performs coordinate conversion of the position detection value from the Y1 linear encoder 26 and the position detection value from the Y2 linear encoder 27 into the Y-axial direction translational position $Y_{fbk}$ and yawing direction position $\theta_{fbk}$ of the Y stage 13. The thrust non-interference block 80 converts the Y-axial direction translational thrust command value $F_{comy}$ and the θ-directional thrust command value $F_{com\theta}$ into the thrust command value $F_{com1}$ for the Y1 linear motor 21 and the thrust command value $F_{com2}$ for the Y2 linear motor 22. Thus, the Y-axial direction translational movement and yawing direction movement are divided between the coordinate conversion block 50 and the thrust non-interference block 80, thus enabling design and adjustment for control and compensation to be performed on two motions of freedom, as independent control systems.

This arrangement has independent control systems for two motions of freedom, so disturbance compensation can be performed for Y-axial direction translational movement by the disturbance observer 60-6.

The principle of the disturbance observer 60-6 will be described with reference to FIG. 6. The Y-axial direction translational movement of the Y stage 13 is motion of an inertial mass (M) driven by the Y-axial direction translational thrust command value $F_{comy}$ generated by the linear motors and the Y-axial direction disturbance force $F_{dy}$. This is expressed as follows, by transfer function.

$$M \cdot s^2 \cdot Y_{fbk} = F_{comy} + F_{dy}$$

Hence, the disturbance force can be calculated with $$F_{dy} = M \cdot s^2 \cdot Y_{fbk} - F_{comy}$$

However, in actual practice, the Y-axial direction translational thrust command value $F_{comy}$ and the feedback input $Y_{fbk}$ contain noise components, so using the above expression directly results in deterioration of the stability of the control system. Accordingly, the band for suppressing disturbance is restricted using the low-pass filter 60-61, and the estimated disturbance force $eF_{dy}$ is calculated. The low-pass filter 60-61 performs filtering at a frequency band wherein disturbance suppression of the Y-axial direction translational thrust command value $F_{comy}$ is desired. The input thrust estimating filter 60-62 estimates the input thrust from the feedback input $Y_{fbk}$ based on the nominal transfer function $M_{nom} \cdot s^2$ of the Y stage 13 (an inverse model of the Y stage 13). The input thrust estimating filter 60-62 includes the same filter (a second low-pass filter) as the low-pass filter 60-61 in addition to the above-mentioned inverse model of the Y stage 13 and calculates only the input thrust at a frequency band where disturbance suppression is desired. The estimated disturbance force $eF_{dy}$ is calculated by the subtracter 60-63 calculating the difference between the thrust command value filtered at the low-pass filter 60-61 and the estimated input thrust from the input thrust estimating filter 60-62. With the properties of the low-pass filter 60-61 represented by G(s), the above computation is expressed by the following expression.

$$eF_{dy} = G(s) \cdot M \cdot s^2 \cdot Y_{fbk} - G(s) \cdot F_{comy}$$

wherein $$G(s) = \omega^2 / (s^2 + 2\zeta \cdot \omega \cdot s + \omega^2).$$

This arrangement uses the estimated disturbance force $eF_{dy}$ calculated based on the above expression, makes feedback to the thrust target value $F_{refy}$ so as to cancel out the disturbance force, and calculates Y-axial direction translational thrust command value $F_{comy}$.

The above has been a description of a preferred embodiment of the present invention, but the driving system of the stage device of which the present invention is applied is not restricted to linear motors, rather, all sorts of actuators are applicable. Also, the guiding system of the stage device is not restricted to static pressure bearings, rather, mechanical contact-type guiding systems such as linear bearings may be used, as well.

The present invention comprises control systems independent as to two motions of freedom, so disturbance force compensation can be made by the disturbance observer regarding the Y-axial direction translational movement, thereby reducing effects on the positioning precision and speed consistency of the stage due to disturbances from such as tension from the signal transmitting cables and the pneumatic tubes and the like, the thrust ripples of the linear motors, etc.

Also, control compensation can be made for the yawing direction movement taking interference and the like due to the mechanical structure into consideration, thereby reducing the yawing margin of error at the time of moving in the Y-axial direction.

Further, allowing the θ-directional control gain to be variable according to the position of the X stage enables change in the yawing margin of error to be reduced. Also, providing θ-axial position command value allows aggressive moving of the yawing direction position.

What is claimed is:

1. A stage position control method, applied to a stage device comprising a stage, a driving axis which mounts said stage and which is driven in one axial direction, and first and second driving units for performing translational driving of said driving axis independently at two positions, said method comprising the steps of detecting the amount of movement of said first and said second driving units by first and second position detecting units, respectively, and controlling said first and said second driving units with first and second feedback control systems, respectively;

wherein said first feedback control system outputs a translational thrust command value to said first and said second driving units, by receiving an average value of each position detecting value measured by said first and said second position detecting units as a position feedback value of the stage translational direction;

and wherein said second feedback control system divides the motion of said stage into translational direction motion and yawing direction motion, and independently performs controlling and compensating thereof, by receiving the difference between said each position detecting value as a position feedback value of the stage yawing direction, and by outputting a yawing direction thrust command value to said first and said second driving units.

2. A stage position control method according to claim 1, wherein non-interference of thrust is realized by adding said translational thrust command value and said yawing direction thrust command value and outputting the result to said first driving unit, and by calculating the difference between said translational thrust command value and said yawing direction thrust command value and outputting the result to said second driving unit.

3. A stage position control apparatus, applied to a stage device comprising a stage, a driving axis which mounts said stage and which is driven in one axial direction, and first and second driving units for performing translational driving of said driving axis independently at two positions, said stage position control apparatus detecting the amount of movement of said first and said second driving units by first and second position detecting units, respectively, and controlling said first and said second driving units with first and second feedback control systems, respectively, said stage position control apparatus comprising:

coordinate converting means for calculating an average value from each position detection value measured by said first and said second position detecting units and outputting the results to said first feedback control system as a position feedback value of the stage translational direction, and also calculating a difference between said each position detection value and outputting the result to said second feedback control system as a position feedback value of the stage yawing direction;

wherein said first feedback control system comprises:
  a first subtracter for calculating a difference between said stage translational direction position command value and said stage translational direction position feedback value;
  a first PID compensator which receives the difference calculated at said first subtracter as an input thereof and outputs a thrust target value;
  a disturbance observer which computes estimated disturbance for the stage, based on said translational thrust command value calculated from said thrust target value and on said stage translational direction position feedback value; and
  a second subtracter for calculating a new translational thrust command value by subtracting said thrust target value from said estimated disturbance for the stage, and outputting the new translational thrust command value to said first and said second driving units;

and wherein said second feedback control system comprises:
  a third subtracter for calculating a difference between said stage yawing direction command value and said stage yawing direction position feedback value; and
  a second PID compensator which receives the difference calculated at said third subtracter as an input thereof and outputs a yawing direction thrust command value to said first and said second driving units.

4. A stage position control apparatus according to claim 3, wherein non-interference of thrust is realized by further comprising a thrust non-interference means, said thrust non-interference means comprising:
  a first adder for adding said translational thrust command value and said yawing direction thrust command value and outputting the result to said first driving unit; and
  a fourth subtracter for calculating a difference between said translational thrust command value and said yawing direction thrust command value and outputting the result to said second driving unit.

5. A stage position control apparatus according to claim 3, wherein said disturbance observer computes said estimated disturbance for the stage from a difference between a thrust command estimation value obtained by filtering said translational thrust command value at a first low-pass filter, and an input thrust estimation value estimated from said stage translational direction position feedback value at a second low-pass filter and an inverse model of said stage.

6. A stage position control apparatus according to claim 3, further comprising:
  a feed-forward compensator for receiving said stage translational direction position command value as an input thereof; and
  a second adder for adding the output of said feed-forward compensator and the output of said first PID compensator and outputting the result as said thrust target value.

7. A stage position control apparatus according to claim 3, wherein said first and said second driving units are a linear motor, and wherein said first and said second position detecting units are a linear encoder.

* * * * *